United States Patent
Deore et al.

(10) Patent No.: US 11,855,395 B2
(45) Date of Patent: Dec. 26, 2023

(54) REMOTE RACKING DEVICE FOR BUS PLUG

(71) Applicant: EATON INTELLIGENT POWER LIMITED, Dublin (IE)

(72) Inventors: Kundan Deore, Nashik (IN); Gordon Pettersen, Greenwood, SC (US); Shrikant Machale, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 159 days.

(21) Appl. No.: 17/214,267

(22) Filed: Mar. 26, 2021

(65) Prior Publication Data
US 2022/0006250 A1 Jan. 6, 2022

Related U.S. Application Data

(63) Continuation of application No. 16/126,440, filed on Sep. 10, 2018, now Pat. No. 10,965,072.

(51) Int. Cl.
*H01R 43/20* (2006.01)
*H01R 25/16* (2006.01)
*H02B 1/21* (2006.01)

(52) U.S. Cl.
CPC ........... *H01R 25/162* (2013.01); *H01R 43/20* (2013.01); *H02B 1/21* (2013.01); *Y10T 29/49208* (2015.01); *Y10T 29/49826* (2015.01)

(58) Field of Classification Search
CPC .... H01R 43/20; H02B 11/133; H02B 11/127; H02B 3/00; Y10T 29/53248; Y10T 29/49826; Y10T 29/49822; Y10T 29/49105
USPC ...... 29/428, 270, 407.1, 756, 762, 764, 825, 29/876
See application file for complete search history.

(56) References Cited

U.S. PATENT DOCUMENTS

| | | | |
|---|---|---|---|
| 3,028,460 A | 4/1962 | Turton | |
| 3,217,211 A | 11/1965 | Norden | |
| 3,354,352 A | 11/1967 | Goodridge | |
| 4,032,207 A | 6/1977 | Ericson | |
| 4,668,035 A | 5/1987 | Jego | |
| 5,097,382 A | 3/1992 | Leach | |
| 6,280,216 B1 | 8/2001 | Bernier | |
| 8,873,223 B2 * | 10/2014 | Rahn | H02B 1/0565 361/615 |
| 8,916,786 B2 | 12/2014 | Gemme | |
| 9,455,541 B2 | 9/2016 | Rathjen | |
| 9,472,369 B2 | 10/2016 | Dozier | |
| 9,490,612 B2 | 11/2016 | Hanna | |

(Continued)

*Primary Examiner* — Thiem D Phan
(74) *Attorney, Agent, or Firm* — Squire Patton Boggs (US) LLP

(57) ABSTRACT

A power distribution system includes a busway and a bus plug. A mechanical assembly rotatably mounts the bus plug relative to the busway. The system includes a remote racking device including a mechanism having a first mechanical component coupled to the bus plug and a second mechanical component coupled to the busway. The remote racking device rotates the bus plug relative to the busway about a rotation axis defined by the mechanical assembly based on mechanical interaction of the first mechanical component and the second mechanical component. Methods of connecting and disconnecting a bus plug relative to a busway with a remote racking device are also provided.

12 Claims, 12 Drawing Sheets

(56) References Cited

U.S. PATENT DOCUMENTS

| | | | |
|---|---|---|---|
| 9,843,172 | B2 | 12/2017 | Yang |
| 10,141,125 | B2 | 11/2018 | Garcia |
| 10,211,582 | B1 | 2/2019 | Orris |
| 2013/0048477 | A1 | 2/2013 | Rahn |
| 2018/0181134 | A1 | 6/2018 | Muck |
| 2019/0052034 | A1 | 2/2019 | Orris |
| 2019/0372339 | A1 | 12/2019 | Burns |

* cited by examiner

REMOTE RACKING DEVICE FOR BUS PLUG

CROSS-REFERENCE TO RELATED APPLICATION

This application is a continuation of U.S. patent application Ser. No. 16/126,440, filed Sep. 10, 2018, the disclosure of which is incorporated herein by reference in its entirety.

FIELD OF INVENTION

The present disclosure relates to remote racking devices. More specifically, the present disclosure relates to remote racking devices for connecting and disconnecting a bus plug relative to a busway.

BACKGROUND

Electric power can be supplied from an active device (e.g., power source) to a passive device (e.g., load source). For example, power stations can generate electric power; electric power companies can supply the electric power through an electric circuit (e.g., electric power grid) to consumers; and consumers can employ one or more devices to convert the electric power into energy to accomplish a variety of objectives. Consumers of electricity include household and residential consumers as well as commercial and industrial consumers.

An electrical distribution system, employing bus plugs connected to a busway, provides localized power distribution to one or more electronic devices (e.g., panels with devices having decision making capability defining a closed loop system), electrical devices (e.g., panels without decision making capability), and electromechanical devices (e.g., motor load).

When connecting or disconnecting a bus plug relative to a busway, an electric arc or electric spark may occur. The electric arc or electric spark places an operator or person in close proximity to the bus plug at risk of electrocution or electric shock. Alternatively, prior to connecting or disconnecting a bus plug relative to a busway, the electric power supplied to the busway may be terminated. While terminating the electric power to the busway eliminates the risk of electrocution or electric shock, it also electrically deactivates or de-energizes electronic devices, electrical devices, and electromechanical devices receiving electric power from additional bus plugs connected to the busway. It is desirable, therefore, to connect and disconnect a bus plug with an active or energized busway while simultaneously reducing or preventing the risk of electrocution or electric shock of an operator or person in close proximity to the bus plug.

Remote devices permit an operator to remotely connect or disconnect an electronic component from an active electrical source, thereby safely placing the operator outside an arc flash boundary of the electronic component. While remote devices have been employed in some electrical applications, no such devices are compatible with bus plugs and busways. Accordingly, for safe and effective distribution of electric power, a remote device for connecting and disconnecting a bus plug relative to a busway is needed.

SUMMARY

In one embodiment, a remote racking device for connecting and disconnecting a bus plug relative to a busway includes a frame having a slot, a lead screw having a threaded shaft rotatably mounted to the frame, and a moving nut having a threaded aperture. The threaded shaft of the lead screw threadingly engages the threaded aperture of the moving nut. The remote racking device includes a pin having a first end extending from the moving nut and oriented to slide along the slot of the frame.

In another embodiment, a power distribution system includes a busway and a bus plug, a mechanical assembly rotatably mounting the bus plug relative to the busway, and a remote racking device. The remote racking device includes a mechanism having a first mechanical component coupled to the bus plug and a second mechanical component coupled to the busway. The remote racking device is oriented to rotate the bus plug relative to the busway about a rotation axis defined by the mechanical assembly based on mechanical interaction of the first mechanical component and the second mechanical component.

In yet another embodiment, a method of racking a bus plug relative to a busway includes imparting a force on a mechanism to operate a mechanical interaction of a first mechanical component coupled to the bus plug and a second mechanical component coupled to the busway. The method includes rotating the bus plug relative to the busway about a rotation axis defined by a mechanical assembly based on the mechanical interaction of the first mechanical component and the second mechanical component.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
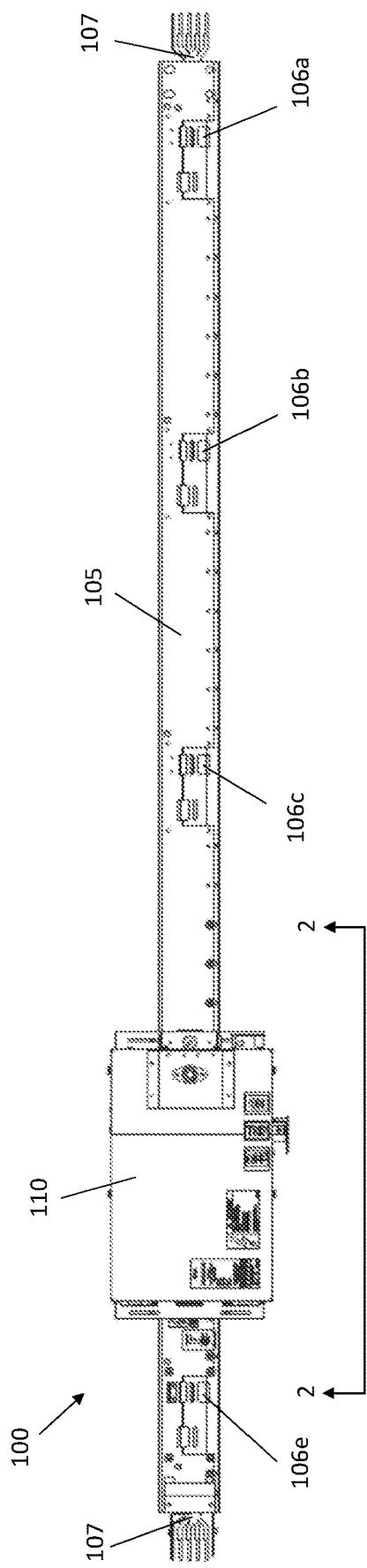
FIG. 1 is a schematic illustration of a plan view of a power distribution system in accordance with embodiments of the disclosure.

FIG. 1 schematically illustrates an exemplary embodiment of a power distribution system 100 including a busway 105 and a bus plug 110. The busway 105 includes a duct having one or more electrically conductive sections 106a-106e that are electrically connected to a bus bar 107 to conduct and distribute an electrical current through the busway 105 (electrically conductive section 106d is covered by bus plug 110 and thus not visible in this view). The bus plug 110 connects to the busway 105 at the one or more electrically conductive sections (106a-106e) and functions as an electrical connector to electrically connect one or more electronic devices, electrical devices, and electromechanical devices (not shown) with the electrical current of the bus bar 107. The bus plug 110 and busway 105 can include brick-insulated protection, which prevents accidental contact with and between electrically-active, live parts and maintains a predetermined creep age clearance distance.

For example, similar to an electrical cord of a household electrical device with an integrated plug that can connect (plug-in) and disconnect (unplug) from a residential electrical receptacle supplied with electrical current from hard-wired electrical wiring, the bus plug 110 connects and disconnects to the busway 105 and provides localized power distribution to one or more electronic devices (e.g., panels with devices having decision making capability defining a closed loop system), electrical devices (e.g., panels without decision making capability), and electromechanical devices (e.g., motor load).

The power distribution system 100 can be employed in a variety of locations where electrical distribution is desired including factories, commercial buildings, and industrial facilities. Additionally, the power distribution system 100 can be employed indoors or outdoors and can be provided for permanent installation (e.g., in a building) or for temporary installation (e.g., at a construction site). In some embodiments, the busway 105 can be installed overhead (e.g., on a ceiling), and the bus plug 110 can connect to the busway 105 providing electrical current from the busway 105 to one or more electrical devices located on the floor below the busway 105. Further, the busway 105 and the bus plug 110 can be installed in a vertical orientation (e.g., extending through multiple stories and floors of a building, such as a high-rise office or hotel, or an apartment complex). Although commonly used in industrial applications employing high electrical current for large electronic devices, electrical devices, and electromechanical devices, unless otherwise noted, the power distribution system 100 of the present disclosure can be employed in a variety of applications for electrical distribution including residential and commercial applications with a variety of electronic devices, electrical devices, and electromechanical devices.

Throughout the disclosure, the bus plug 110 and the busway 105 are schematically illustrated with the understanding that the power distribution system 100 including the bus plug 110 and the busway 105 can include or be employed either alone or in combination with a variety of electrical components. For example, the bus plug 110 and the busway 105 can include wires, capacitors, inductors, transformers, reducers, amplifiers, fuses, switches, connectors, detectors, sensors, transducers, resonators, semiconductors, cables, timers, tubes, suppressors, and terminals oriented to provide one or more operations or functions with respect to distribution of electric power from, for example, one or more active devices to one or more passive devices. Likewise, a size or electrical rating of any component of the bus plug 110 and the busway 105 can be selected and modified depending on a particular application in which the bus plug 110 and the busway 105 may be used, a particular ampacity of electrical current employed, a particular voltage rating, or other factors dictating a size or electrical rating of an electrical component.

The action of connecting and disconnecting a bus plug 110 relative to a busway 105 is known as "racking." A "rack-in" operation electrically connects the bus plug 110 with a conductive section (106a-106e) of the busway 105 such that an electrical current is conducted from the bus bar 107 to the bus plug 110, whereby the bus plug 110 is active or energized. Conversely, a "rack-out" operation electrically disconnects the bus plug 110 from a conductive section (106a-106e) of the busway 105 such that the bus plug 110 is inactive or de-energized and not receiving electrical current from the bus bar 107.

The ability to connect and disconnect a bus plug 110 relative to a busway 105 provides a dynamic power distribution system 100 that can be changed and modified over time to accommodate different electronic devices, electrical devices, and electromechanical devices, different placement or movement of electronic devices, electrical devices, and electromechanical devices, and different layouts and floorplans. Additionally, a technician can disconnect the bus plug 110 from the busway 105 to deactivate the electronic devices, electrical devices, and electromechanical devices and perform maintenance on the deactivated electronic devices, electrical devices, and electromechanical devices or rearrange the power distribution system 100 without the risk of electrocution. After performing the maintenance, the technician can then reconnect the bus plug 110 to the busway 105 to reestablish an electrical connection with the repaired, replaced, or rearranged electronic devices, electrical devices, and electromechanical devices.

When racking the bus plug 110 relative to an energized busway 105, an electric arc or electric spark may occur. Thus, an operator or other person in close proximity to the bus plug 110 during the racking operation may be at risk of electrocution or electric shock. Alternatively, prior to racking the bus plug 110, the electric power supplied to the entire bus bar 107 of the busway 105 may be terminated, thereby eliminating the risk of electrocution or electric shock. Terminating the electric power to the busway 105, however, also electrically deactivates or de-energizes other electronic devices, electrical devices, and electromechanical devices receiving electric power from additional bus plugs (not shown) that may be connected to the bus bar 107 of the busway 105. Thus, deactivating an entire busway 105 can result in downtime of many electronic devices, electrical devices, and electromechanical devices, which can be unnecessarily timely and costly. It is desirable, therefore, to rack (e.g., connect and disconnect) a bus plug 110 with an active or energized busway 105 while also reducing or preventing the risk of electrocution or electric shock of an operator or person in close proximity to the bus plug 110.

Figure 2:
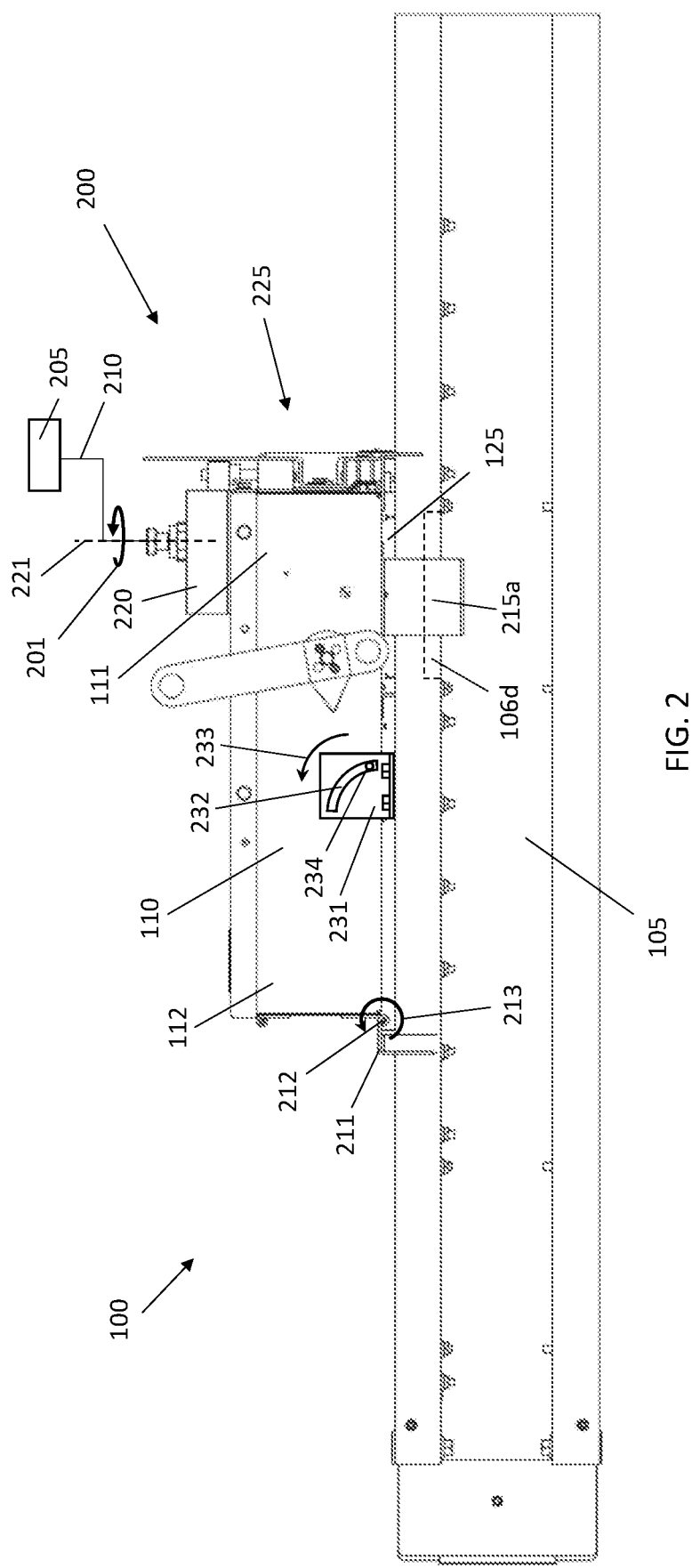
FIG. 2 is side view of a portion of the power distribution system of FIG. 1 taken at line 2-2 of FIG. 1 including a bus plug connected to a busway.

Remote racking devices can rack (e.g., connect and disconnect) a bus plug 110 with an active or energized busway 105 and reduce or prevent the risk of electrocution or electric shock of an operator or person in close proximity to the bus plug 110. Remote racking devices in accordance with embodiments of the disclosure are disclosed with reference to FIGS. 2-12 in which FIG. 2 shows a side view of the bus plug 110 and a portion of the busway 105 taken at line 2-2 of FIG. 1.

Figure 3:
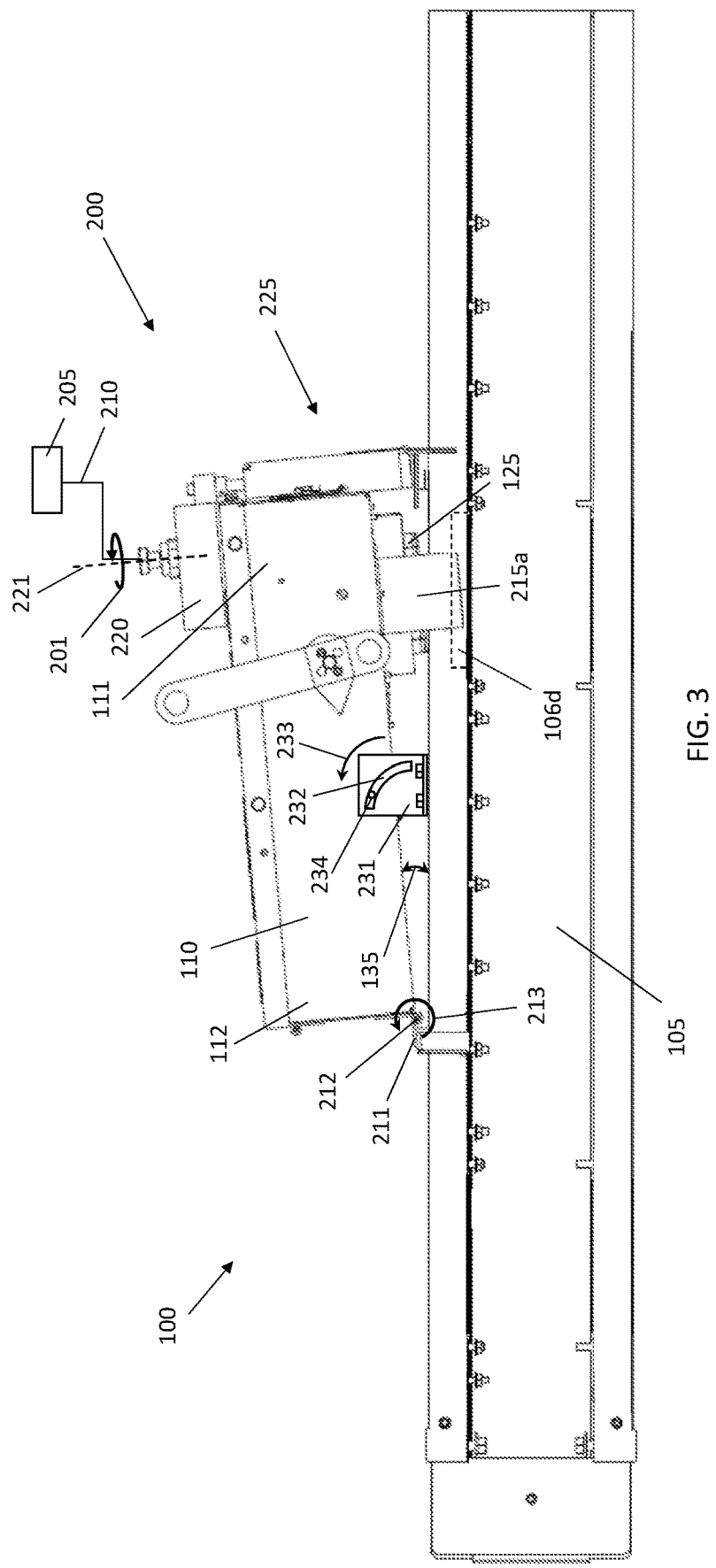
FIG. 3 is a side view of the portion of the power distribution system of FIG. 2 with the bus plug disconnected from the busway.

The power distribution system 100 includes a remote racking device 200 oriented to remotely connect and disconnect the bus plug 110 relative to the busway 105. In some embodiments, the remote racking device 200 includes controller 205 such as a remote control or operator interface device. The controller 205 communicates with an actuator 220 via a wired connection 210 or a wireless connection (not shown). The actuator 220 is mechanically connected to a mechanism 225 and is oriented to operate the mechanism 225. The mechanism 225 is configured to connect and disconnect the bus plug 110 relative to the busway 105. For example, as schematically illustrated in FIG. 2, the remote racking device 200 is operable to remotely connect the bus plug 110 to the busway 105, where the bus plug 110 is provided in a "racked-in," electrically active or energized state. Likewise, as schematically illustrated in FIG. 3, the remote racking device 200 is operable to remotely disconnect the bus plug 110 from the busway 105, where the bus plug 110 is provided in a "racked-out," electrically inactive or de-energized state.

By providing the remote racking device 200 in accordance with embodiments of the disclosure, an operator can perform a racking operation while positioned at a predetermined distance from the bus plug 110. For example, the operator can interact with the controller 205 to control a racking-in and racking-out operation of the bus plug 110 relative to the busway 105 at a predetermined distance defined outside an arc flash protection boundary of the bus plug 110. By placing the operator outside the arc flash protection boundary while connecting or disconnecting the bus plug 110 relative to the busway 105, the risk of electrocution or electric shock is reduced or eliminated.

In some embodiments, the actuator 220 and the controller 205 can be permanently integrated (e.g., connected) with the mechanism 225 to selectively control the mechanism 225. Alternatively, one or more of the actuator 220 and the controller 205 can be temporarily integrated with the mechanism 225 (e.g., during a racking operation) and then removed (e.g., after performing the racking operation). Thus, in some embodiments, a single actuator 220 and a single controller 205 can be employed a plurality of times to remotely control a racking operation of one or more bus plugs 110 relative to one or more busways 105.

Further, the racking mechanism 225 provides mechanical advantage for easily racking (e.g., reducing the force manually applied to the bus plug 110) during a manual installation of the mechanism 225 and during manual rack-in and rack-out operations of the bus plug 110 with the busway 105. The mechanism 225 also ensures proper alignment of the bus plug 110 and the bus way 105 each time during a racking operation.

In some embodiments, the actuator 220 includes a rotary actuator (e.g., motor) oriented to provide a rotation force 201 about a rotation axis 221. In further embodiments, the actuator 220 can include one or more mechanical and electro-mechanical components oriented to impart a motion including, but not limited to, mechanical linkages and gears operable to impart the rotation force 201 on the mechanism 225. Moreover, in some embodiments, the rotation force 201 can be provided by mechanical or manual force, including one or more of an external, detachable handle, a spanner tool, an extendable tool or other device enabling a user (e.g., wearing proper personal protective equipment, PPE) to perform a racking operation manually (e.g., without the actuator 220).

The mechanism 225 connects and disconnects the bus plug 110 relative to the busway 105 based at least in part on the rotation force 201. For example, as shown sequentially between FIG. 2 and FIG. 3, the mechanism 225 rotates the bus plug 110 relative to the busway 105 to respectively engage and disengage conductors 125 of the bus plug 110 with conductive section 106d (shown in hidden lines) of the bus bar 107 of the busway 105.

Based on operation of the mechanism 225, a first end 111 of the bus plug 110 rotates relative to a second end 112 of the bus plug 110 to respectively engage and disengage the conductors 125 with the conductive section 106d. The bus plug 110 is rotatably mounted relative to the busway 105 with a mechanical assembly 211, 231 defining a rotation axis. For example, the second end 112 of the bus plug 110 can be rotatably mounted relative to the busway 105 with a hinge assembly 211. As shown by arrow 213, based on operation of the mechanism 225, the first end 111 of the bus plug 110 rotates relative to the second end 112 about a rotation axis 212 defined by the hinge assembly 211.

In addition or alternatively, the bus plug 110 can be rotatably mounted relative to the busway 105 with a bracket assembly 231 mounted to the busway 105 at a location defined at a point between the first end 111 and the second end 112 of the bus plug 110. The bracket assembly 231 can be mounted to the busway 105 with a variety of fasteners and includes an arcuate recess 232 (e.g., groove, slot, aperture) defining an arcuate path extending along a rotation direction 233 of the bus plug 110. A protrusion 234 extending from the bus plug 110 slidingly engages the arcuate recess 232. As shown by arrow 233, based on operation of the mechanism 225, the first end 111 of the bus plug 110 rotates relative to the second end 112 with the protrusion 234 sliding along the arcuate path defined by the arcuate recess 232 of the bracket assembly 231.

In some embodiments, hinge assembly 211 and bracket assembly 231 can be provided together to rotatably mount the bus plug 110 relative to the busway 105, with the bracket assembly 231 including the arcuate recess 232 and protrusion 234 serving as a guide to direct the rotational movement of the bus plug 110. Alternatively, the hinge assembly 211 can be provided without the bracket assembly 231 to rotatably mount the bus plug 110 relative to the busway 105. Likewise, the bracket assembly 231 can be provided without the hinge assembly 211 to rotatably mount the bus plug 110 relative to the busway 105. Further, more than one bracket assembly 231 can be provided to rotatably mount the bus plug 110 relative to the busway 105 (e.g., on each side of the bus plug 110) directing the rotational movement of the bus plug 110 along the arcuate slot 232.

As the bus plug 110 rotates during a rack-out operation, an angle 135 defined between the bus plug 110 and the busway 105 increases until the conductors 125 electrically disconnect from the conductive section 106d and the bus plug 110 is de-energized, as shown in FIG. 3. Further, a rack-out operation maintains a predetermined clearance distance and creep age distance between the bus plug 110 and the bus way 105 for one or more rated voltage/ampacity classifications. Conversely, as the bus plug 110 rotates during a rack-in operation, the angle 135 decreases until the conductors 125 electrically connect to the conductive section 106*d* and the bus plug 110 is energized. Unless otherwise noted, the racking operation can occur a single time or be performed a plurality of times to connect and disconnect the bus plug 100 relative to the busway 105 as desired.

Optionally, the remote racking device 200 can include a pair of alignment tabs 215*a*, 215*b* (alignment tab 215*b* is not visible in this view). The alignment tabs 215*a*, 215*b* are fixed to the bus plug 110 and spaced a predetermined distance apart from each other. The predetermined distance is defined by a dimension (e.g., width) of the busway 105. As shown in FIG. 2, in operation, as the mechanism 225 rotates the bus plug 110 relative to the busway 105, the alignment tabs 215*a*, 215*b* mate with the busway 105 and align the bus plug 110 with the busway 105 ensuring the conductors 125 align with and engage the conductive section 106*d* of the bus bar 107. Moreover, as shown in FIG. 3, when the bus plug 110 is disconnected from the busway 105, the alignment tabs 215*a*, 215*b* can shield and obstruct the conductors 125 and the conductive section 106*d*. By shielding and obstructing the conductors 125 and the conductive section 106*d*, the alignment tabs 215*a*, 215*b* not only protect the conductors 125 and the conductive section 106*d* from dirt, debris, and unintentional contact or force, but also provide an added level of safety by restricting access to the conductors 125 and the conductive section 106. Thus, during a racking operation, if electrical current is supplied to the bus bar 107 of the busway 105, the alignment tabs 215*a*, 215*b* prevent a bystander, operator, technician, or other person from intentionally or accidentally contacting the electrical current present in the conductive section 106*d* and thereby reduce the risk of electrocution or electric shock.

Figure 4:
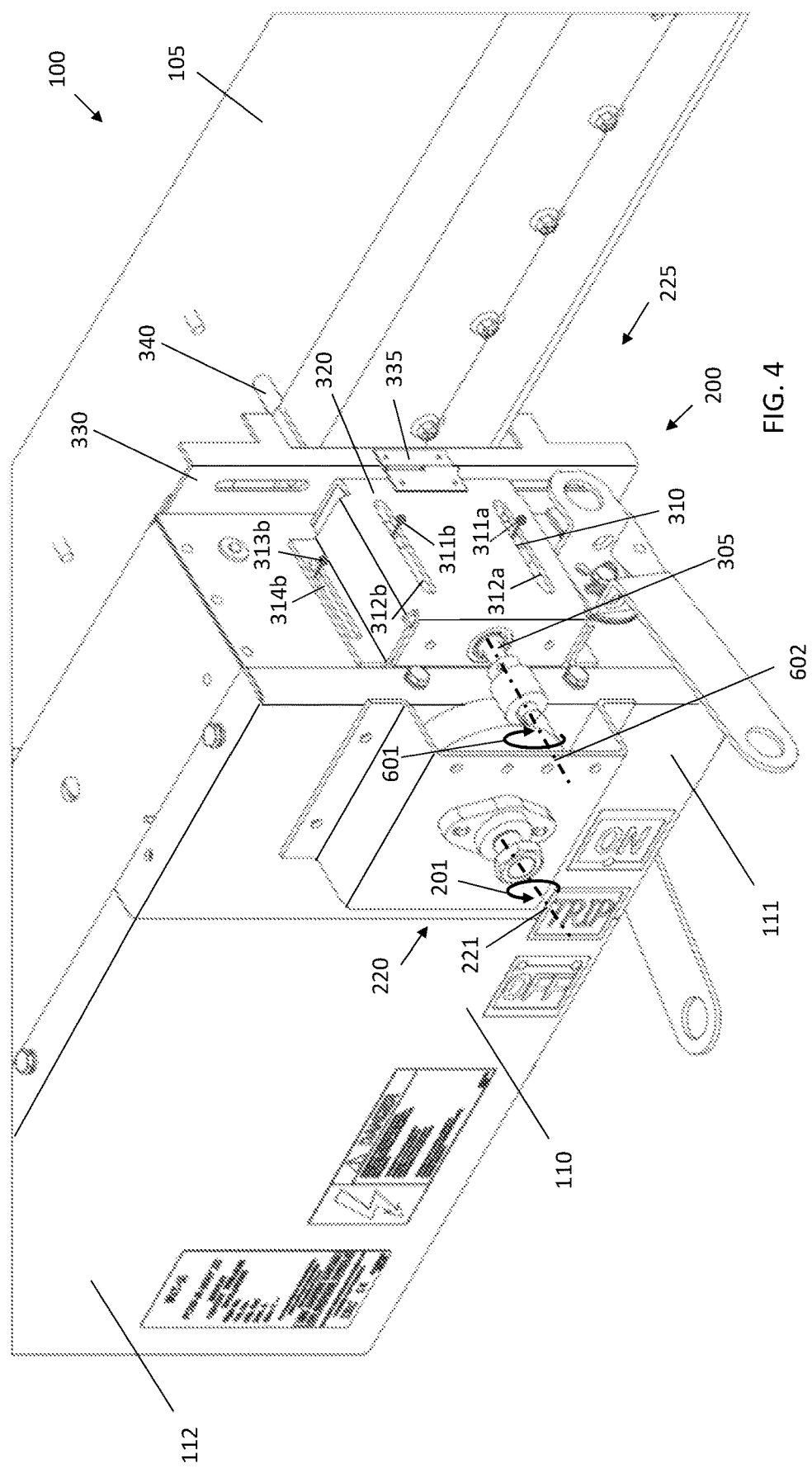
FIG. 4 is a perspective view of the bus plug and the busway of the power distribution system of FIGS. 1-3 including a first embodiment of a mechanism for connecting and disconnecting the bus plug relative to the busway.
Figure 5:
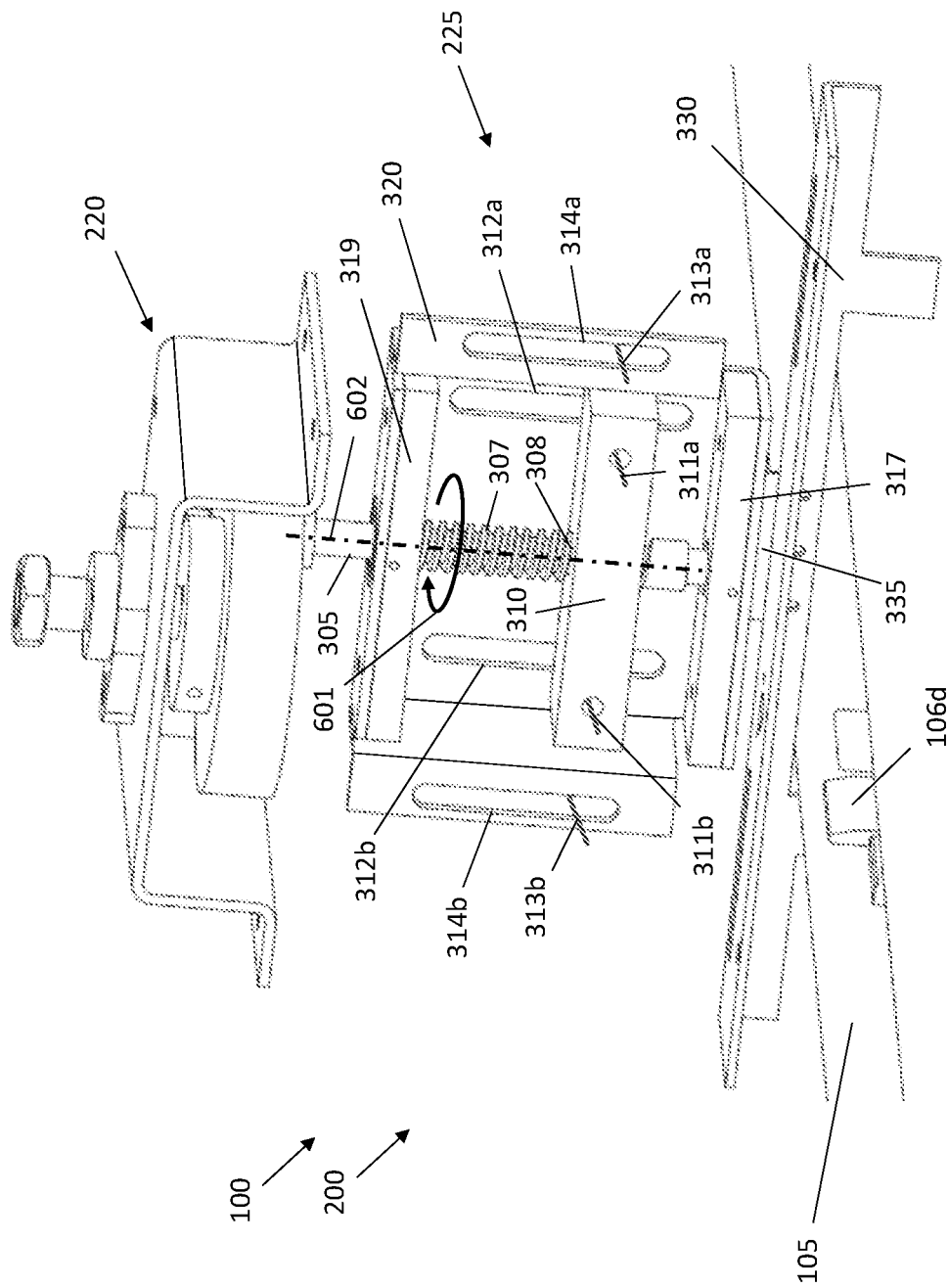
FIG. 5 is an alternate perspective view of the first embodiment of the mechanism of FIG. 4 with some features removed for clarity.
Figure 6:
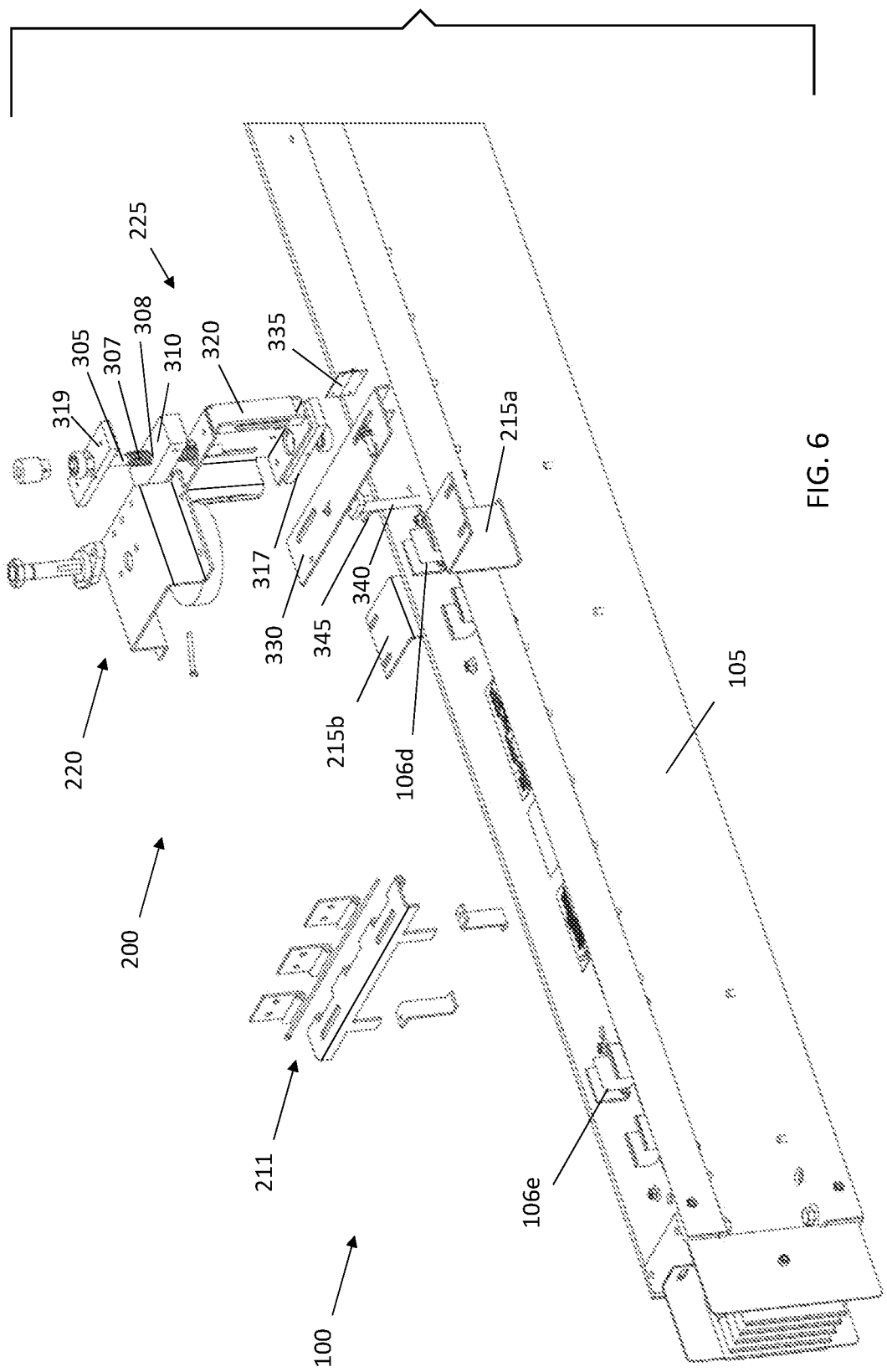
FIG. 6 is an exploded perspective view of the first embodiment of the mechanism of FIG. 4 and FIG. 5 with some features removed for clarity.
Figure 7:
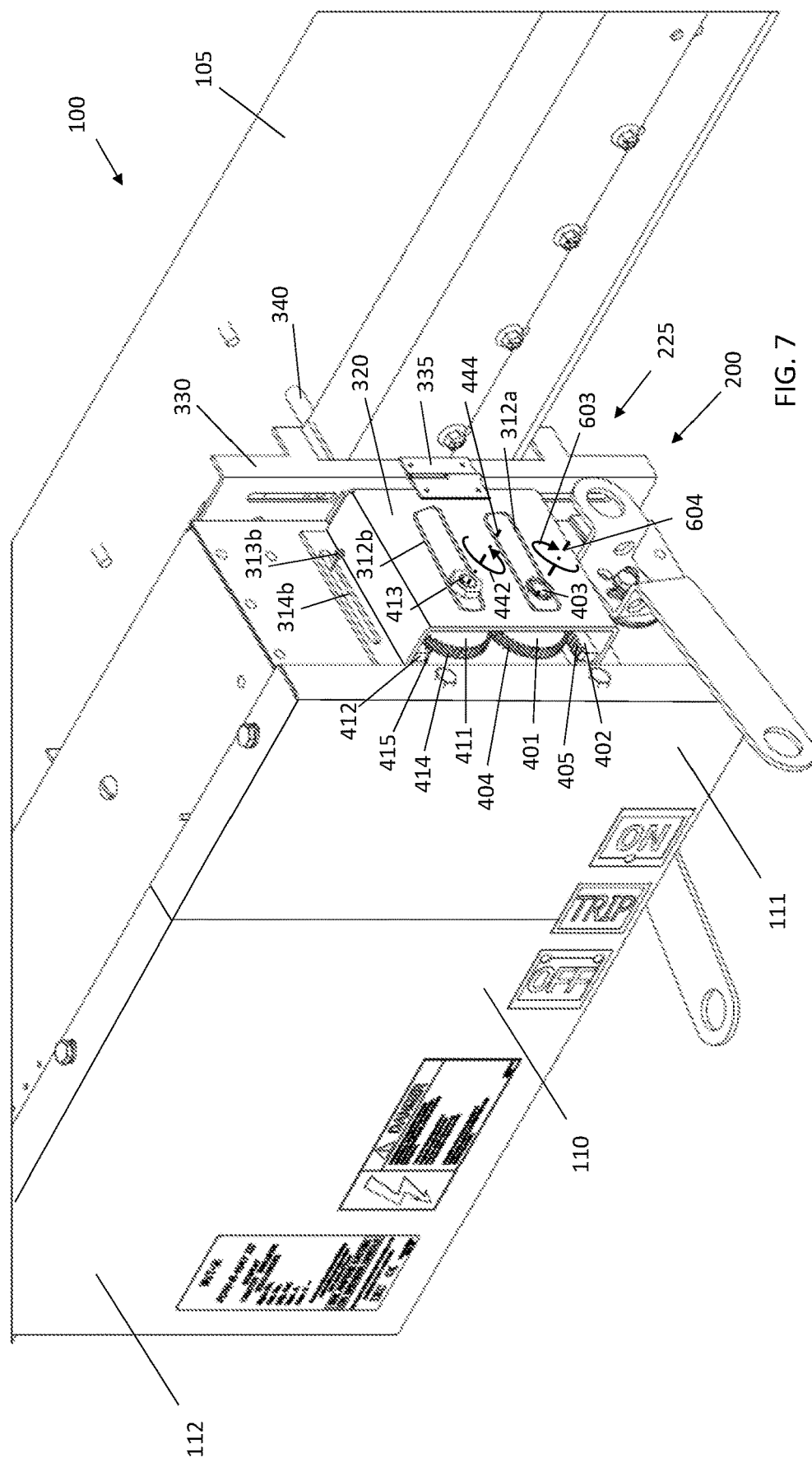
FIG. 7 is a perspective view of the bus plug and the busway of the power distribution system of FIGS. 1-3 including a second embodiment of a mechanism for connecting and disconnecting the bus plug relative to the busway.
Figure 8:
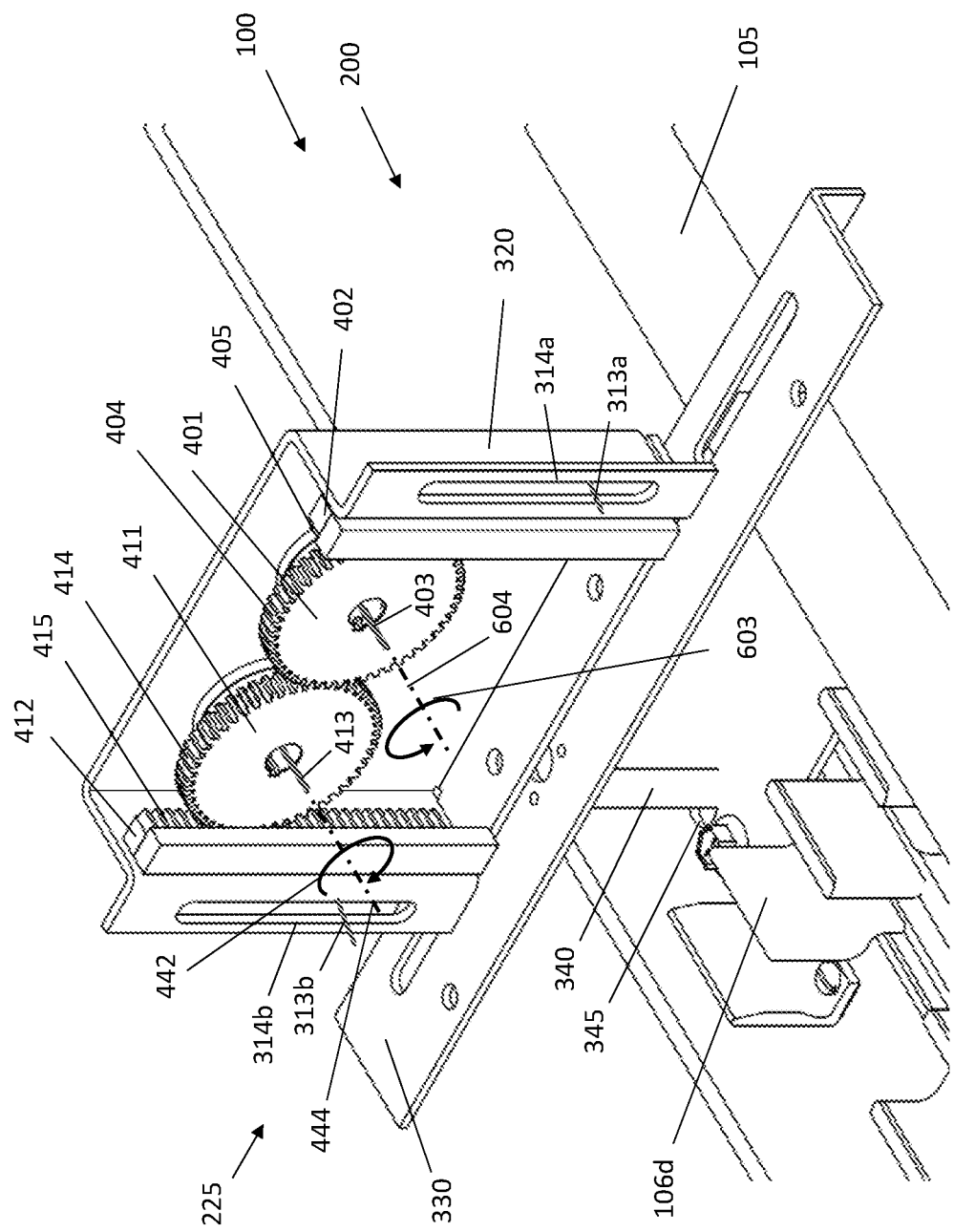
FIG. 8 is an alternate perspective view of the second embodiment of the mechanism of FIG. 7 with some features removed for clarity.
Figure 9:
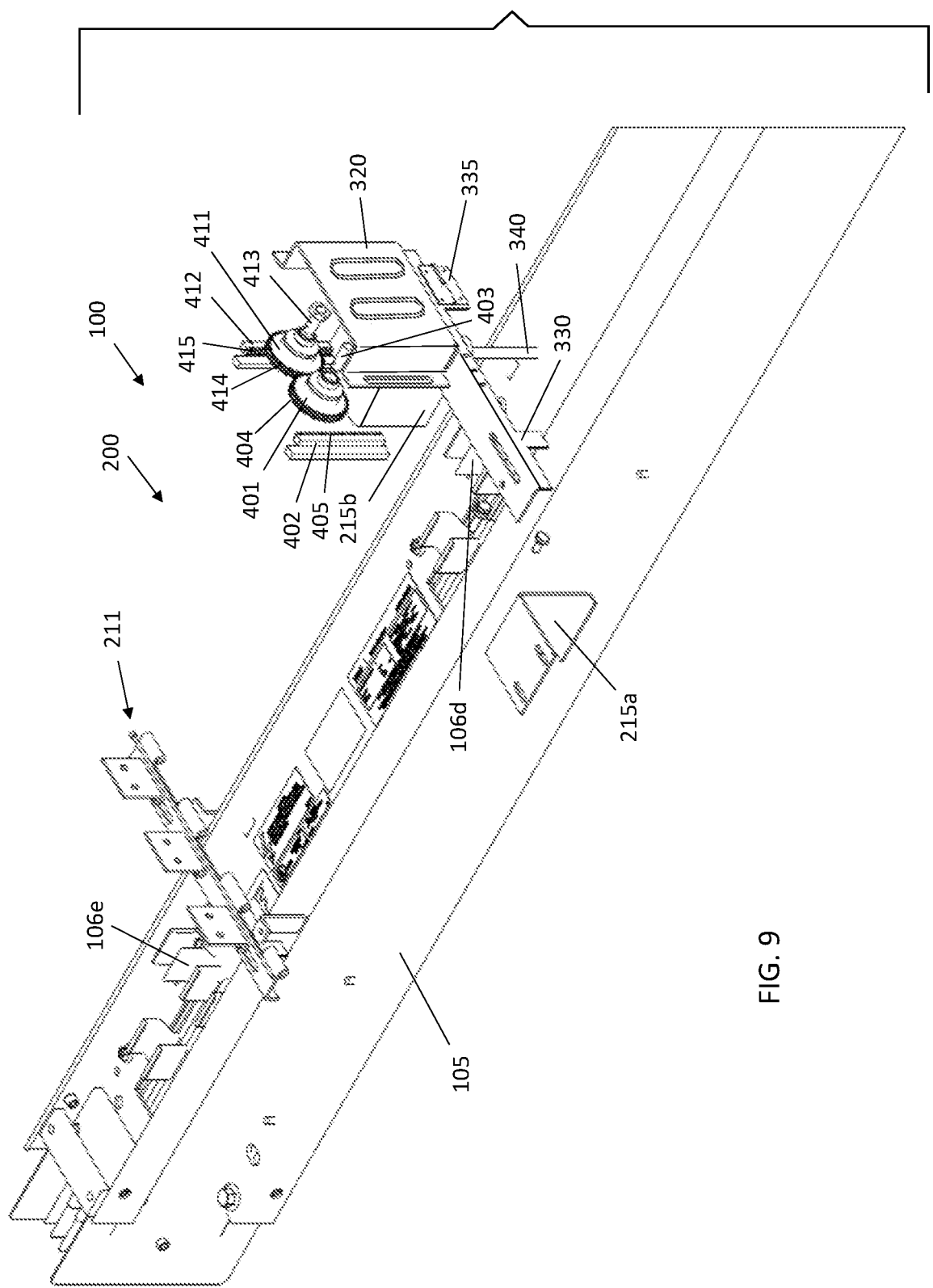
FIG. 9 is an exploded perspective view of the second embodiment of the mechanism of FIG. 7 and FIG. 8 with some features removed for clarity.
Figure 10:
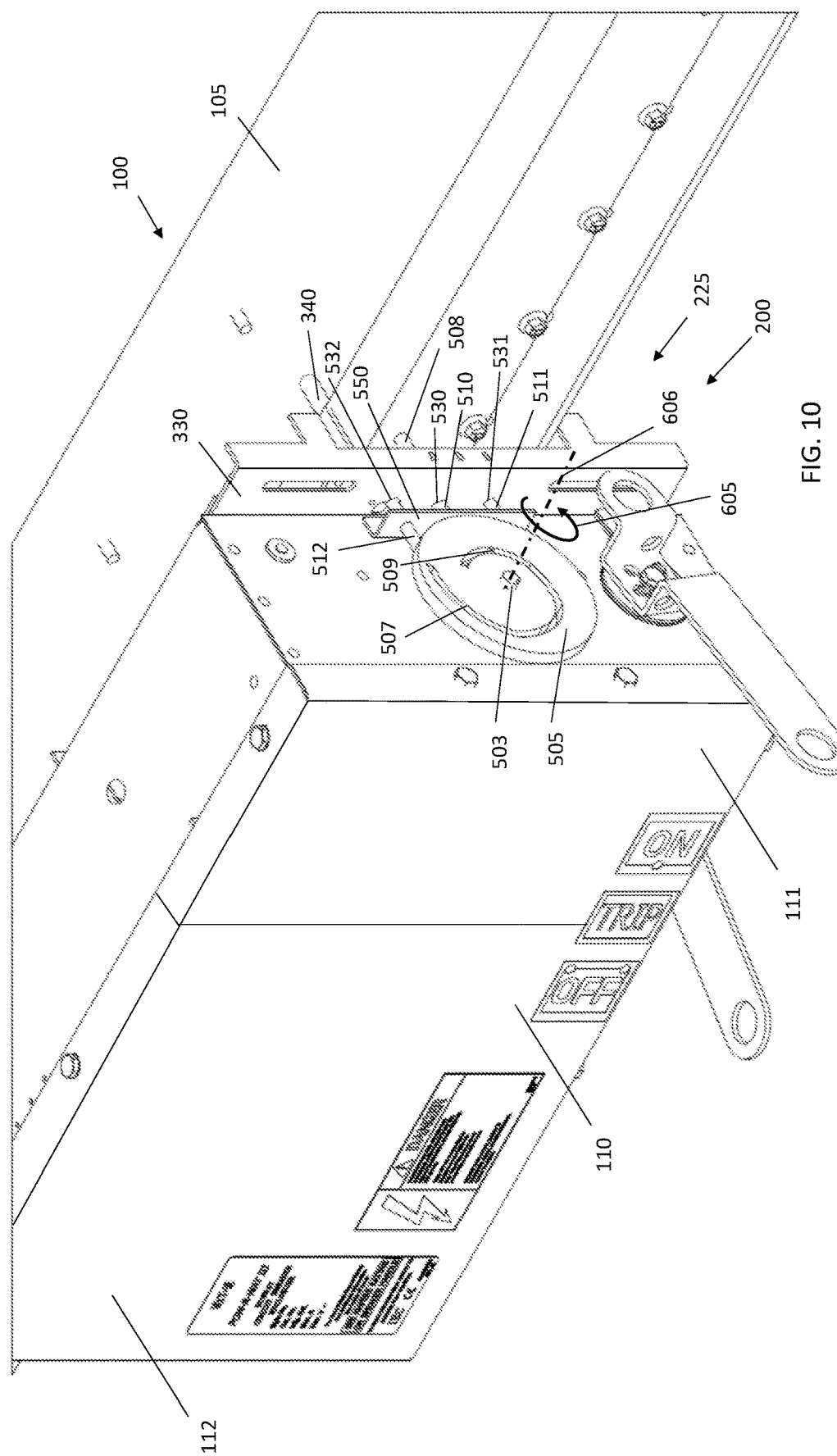
FIG. 10 is a perspective view of the bus plug and the busway of the power distribution system of FIGS. 1-3 including a third embodiment of a mechanism for connecting and disconnecting the bus plug relative to the busway.
Figure 11:
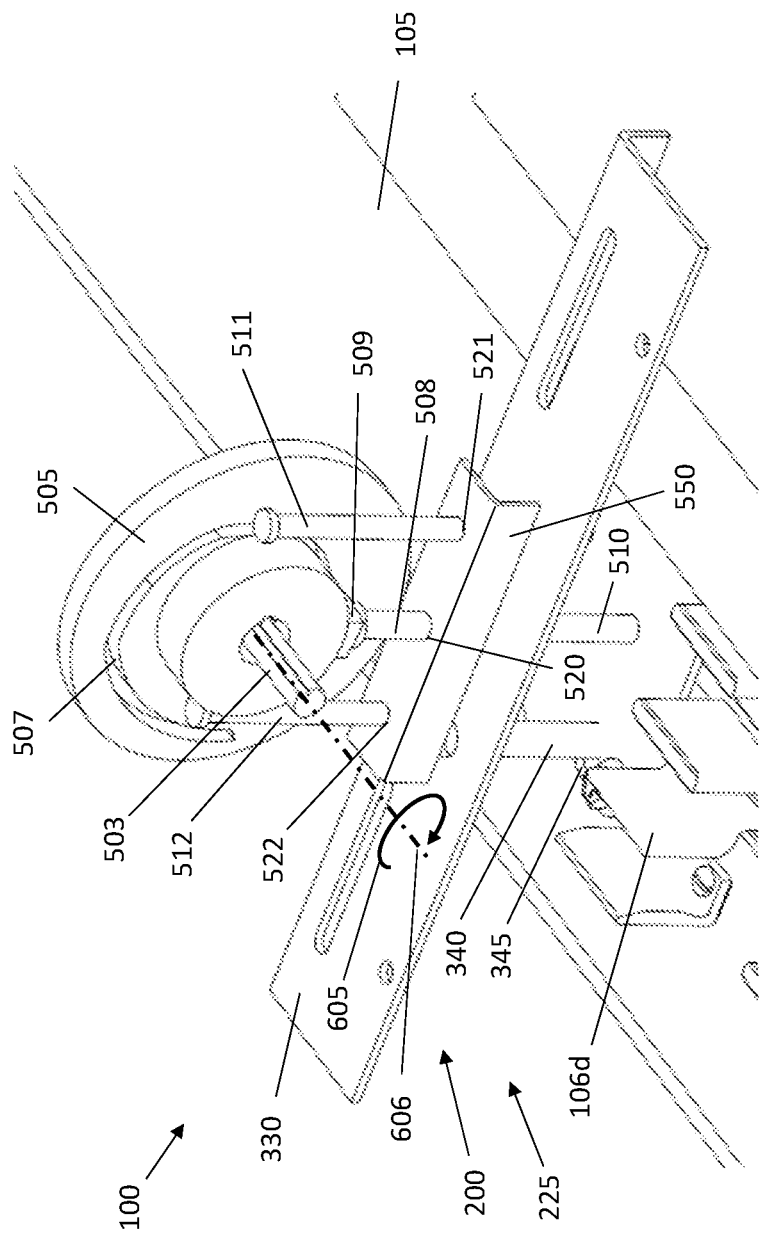
FIG. 11 is an alternate perspective view of the third embodiment of the mechanism of FIG. 10 with some features removed for clarity.
Figure 12:
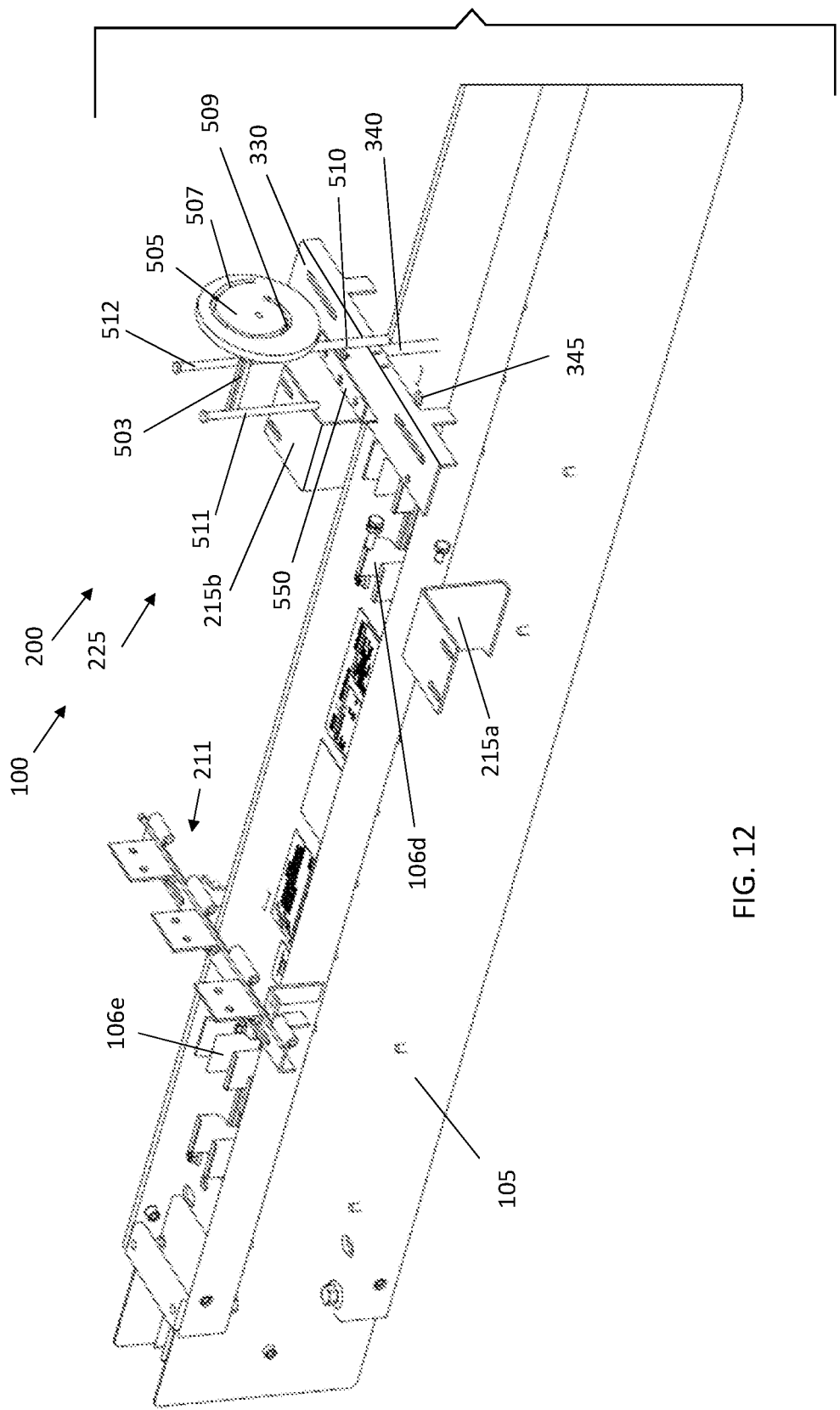
FIG. 12 is an exploded perspective view of the third embodiment of the mechanism of FIG. 10 and FIG. 11 with some features removed for clarity.

Three alternate embodiments of the mechanism 225 are described in FIGS. 2-12 with the understanding that features of one or more embodiments can be provided either alone or in combination with features of another or more embodiments to define the mechanism 225. In particular, FIGS. 4-6 illustrate a first embodiment of the mechanism 225 including a lead screw 305 and a moving nut 310 operable to connect and disconnect the bus plug 110 relative to the busway 105. FIGS. 7-9 illustrate a second embodiment of the mechanism 225 including a rack 402 and pinion 401 operable to connect and disconnect the bus plug 110 relative to the busway 105. FIGS. 10-12 illustrate a third embodiment of the mechanism 225 including a cam 505 and follower 510 operable to connect and disconnect the bus plug 110 relative to the busway 105. It should be understood that these embodiments are not intended to be limiting and that other mechanisms may be employed.

The actuator 220 is shown with respect to the first embodiment (FIGS. 4-6) and is removed for clarity with respect to the second embodiment (FIGS. 7-9) and the third embodiment (FIGS. 10-12). Unless otherwise noted, an actuator 220 oriented to provide a rotation force 201 about a rotation axis 221 can be provided with the mechanism 225 and configured to impart (e.g., transfer), either directly or indirectly, the rotation force 201 on the mechanism 225. For example, the imparted rotation force provided by the actuator 220 is shown as rotation force 601 about rotation axis 602 in FIG. 4 and FIG. 5, rotation force 603 about rotation axis 604 in FIG. 7 and FIG. 8, and rotation force 605 about rotation axis 606 in FIG. 10 and FIG. 11. Similarly, the controller 205 is removed for clarity from FIGS. 4-12 and can be provided in further embodiments to control the operation of the actuator 220 and the mechanism 225 as discussed with respect to FIGS. 1-3.

FIG. 4 is a perspective view of the power distribution system 100 and the remote racking device 200 showing the first embodiment of the mechanism 225 including a lead screw 305 and a moving nut 310. The moving nut 310 is mechanically linked to the bus plug 110 with fasteners 311*a*, 311*b* (e.g., bolts, screws, rods, linkage). In the illustrated embodiment, the fasteners 311*a*, 311*b* extend through respective slot 312*a*, 312*b* defined in a frame 320 of the mechanism 225, through apertures in the moving nut 310, and connect with the bus plug 110. Although two fasteners 311*a*, 311*b* and two slots 312*a*, 312*b* are shown, in some embodiments, a single fastener and a single slot or more than two fasteners and more than two slots can be provided without departing from the scope of the disclosure.

As shown in FIG. 5, which is an alternate perspective view of the first embodiment of the mechanism 225 of FIG. 4 with some features including the bus plug 110 removed for clarity, the lead screw 305 threadingly engages the moving nut 310. For example, the lead screw 305 includes a threaded shaft 307 that mates with a threaded aperture 308 of the moving nut 310. In some embodiments, the mechanism 225 can include one or more shaft bearings 317, 319 rotatably coupled with the lead screw 305 and oriented to facilitate rotation of the lead screw 305 relative to the frame 320.

When operated, the rotation force 601 about rotation axis 602 causes the lead screw 305 to rotate about the rotation axis 602. Unless otherwise noted, the rotation force 601 can be applied to the lead screw 305 (e.g., by actuator 220) from a variety of directions, angles, and positions. For example, the actuator 220 can be configured on a top, bottom, side, front, or back, of the bus plug 110 relative to the lead screw 305 to impart the rotation force 602. Based on the threaded engagement with the moving nut 310, the rotation of the lead screw 305 causes the moving nut 310 to travel along the threaded shaft 307 of the lead screw 305. For example, in some embodiments, rotation of the lead screw 305 in a first rotation direction (e.g., clockwise or counterclockwise direction) causes the moving nut 310 to travel along a linear path defined by the threaded shaft 307 of the lead screw 305 in a first direction. Conversely, rotation of the lead screw 305 in a second rotation direction opposite the first rotation direction (e.g., counterclockwise or clockwise direction) causes the moving nut 310 to travel along a linear path defined by the threaded shaft 307 in a second direction opposite the first linear direction.

Additionally, the remote racking device 200 can include a bracket 330 mechanically linking the busway 105 and the mechanism 225. The bracket 330 is fixed to the busway 105 (e.g., with one or more fasteners, mechanical connections, adhesives, or material bonding or welding techniques) and anchors the frame 320 of the mechanism 225 to the busway 105. In some embodiments, a hinged fastener 335 can be positioned between the frame 320 and the bracket 330 to mechanically link the frame 320 and the bracket 330. For example, the hinged fastener 335 mechanically links the frame 320 and the bracket 330 while allowing the frame 320 to rotate about the hinged fastener 335 as the first end 111 of the bus plug 110 raises and lowers relative to the busway 105 and rotates relative to the rotation axis 212 of the hinge assembly 211 or as the protrusion 234 of the bracket assembly 231 slides along the arcuate recess 232 guiding the rotational movement of the bus plug 110.

With the frame 320 of the mechanism 225 anchored to the busway 105 and the moving nut 310 mechanically linked with the bus plug 110, as the lead screw 305 rotates, the moving nut 310 travels along the threaded shaft 307 of the rotating lead screw 305. Based on the travel of the moving nut 310, the first end 111 of the bus plug 110 raises or lowers relative to the busway 105. As schematically illustrated in FIG. 2 and FIG. 3, as the first end 111 of the bus plug 110 raises or lowers relative to the busway 105, the mechanism 225 causes the bus plug 110 to rotate relative to the second end 112 of the bus plug 110 about the rotation axis 213 defined by the hinge assembly 211 or as the protrusion 234 of the bracket assembly 231 slides along the arcuate recess 232 guiding the rotational movement of the bus plug 110. Accordingly, employing the actuator 220 and the controller 105, operation of the mechanism 225 including the lead screw 305 and the moving nut 310 can be performed to remotely connect and disconnect the bus plug 110 relative to the busway 105.

Turning back to FIG. 4, as the moving nut 310 travels along the threaded shaft 307 of the rotating lead screw 305, the fasteners 311a, 311b correspondingly travel along the slots 312a, 312b defined in the frame 320. The slots 312a, 312b define a guide path along which the moving nut 310 travels and can facilitate predictable, repeatable alignment and travel of the moving nut 310 during successive racking operations. Optional guide pins 313a, 313b extending from the bus plug 310 and mating with corresponding guide slots 314a, 314b defined in the frame 320 may be provided. As the moving nut 310 travels along the threaded shaft 307 of the lead screw 305, the guide pins 313a, 313b and corresponding guide slots 314a, 314b can further facilitate predictable, repeatable alignment and travel of the moving nut 310 during successive racking operations.

FIG. 6 is an exploded perspective view of the first embodiment of the mechanism 225 of FIG. 4 and FIG. 5 with some features removed for clarity. In some embodiments, the remote racking device 200 can include a guide rod 340 connected to the bracket 330. The guide rod 340 is oriented to mate with a corresponding alignment feature 345 (e.g., aperture, notch, recess) defined in the busway 105. Accordingly, when installing the bracket 330 to the busway 105, a technician or installer can align the guide rod 340 with the alignment feature 345 to ensure proper placement and alignment of the bracket 330 relative to the busway 105. Ensuring proper placement and alignment of the bracket 330 relative to the busway 105, during installation of the remote racking device 200, can facilitate reliable and improved operation of the mechanism 225 during a racking operation.

FIG. 7 is a perspective view of the power distribution system 100 and the remote racking device 200 showing the second embodiment of the mechanism 225 including a rack 402, 412 and pinion 401, 411. Although a double rack and pinion (e.g., two racks 402, 412 and two pinions 401, 411) is shown, in some embodiments, a single rack and pinion or more than two racks and two pinions can be provided without departing from the scope of the disclosure. In the illustrated embodiment, the pinions 401, 411 are mechanically, rotatably linked to the bus plug 110 with fasteners 403, 413 (e.g., bolts, screws, rods, linkage) that are rotatable about respective rotation axes 604, 444. The fasteners 403, 413 extend through respective slots 312a, 312b defined in the frame 320 of the mechanism 225, through apertures in each pinion 401, 411, and connect with the bus plug 110. Although two fasteners 403, 413 and two slots 312a, 312b are shown, in some embodiments, a single fastener and a single slot or more than two fasteners and more than two slots can be provided (e.g., based on a corresponding number of racks and pinions) without departing from the scope of the disclosure.

Rack 402 includes teeth 405 extending along a travel path that mate (e.g., mesh) with teeth 404 of pinion 401 extending around the circumference of the pinion 401. Similarly, rack 412 includes teeth 415 extending along a travel path that mate with teeth 414 of pinion 411 extending around the circumference of the pinion 411. As shown in FIG. 8, which is an alternate perspective view of the second embodiment of the mechanism 225 of FIG. 7 with some features including the bus plug 110 removed for clarity, the racks 402, 412 are mechanically fixed to the frame 320 with the pinions 401, 411 rotatably coupled to the bus plug 110. FIG. 9 shows an exploded perspective view of the second embodiment of the mechanism 225 of FIG. 7 and FIG. 8 with some features removed for clarity to illustrate the respective teeth 405, 415 of the racks 402, 412 and the respective teeth 404, 414 of the pinions 401, 411. Each pinion 401, 411 is oriented to rotate about the respective rotation axes 604, 444 of the fasteners 403, 413 relative to the frame 320 and the bus plug 110 based on engagement among the teeth 405, 415 of the racks 402, 412 and the teeth 404, 414 of the pinions 401, 411

Referring to FIG. 7 and FIG. 8, the teeth 404 of pinion 401 are oriented to mate with teeth 414 of pinion 411. In some embodiments, the travel path defined by the teeth 405 of rack 402 can extend parallel to the travel path defined by the teeth 415 of rack 412. The teeth 404, 405, of the racks 402, 412 and the teeth 414, 415 of the pinions 401, 411 can be selected to have a variety of different sizes and spacing to provide different gearing, rotation, and displacement based on the meshing relationship between the racks 402, 412 and pinions 401, 411. Likewise, the racks 402, 412 and pinions 401, 411 can be selected to have a variety of different sizes (e.g., lengths, diameters) to provide different gearing, rotation, and displacement based on the meshing relationship between the racks 402, 412 and pinions 401, 411.

When operated, the rotation force 603 about rotation axis 604 causes the pinion 401 to rotate about the rotation axis 604. Based on the meshing engagement of pinion 401 with pinion 411, the rotation of the pinion 401 causes the pinion 411 to rotate. Further, as the pinions 401, 411 rotate, based on the meshing engagement between the pinions 401, 411 and the racks 402, 412, the pinions 401, 411 travel together along the travel paths of the racks 402, 412. For example, in some embodiments, rotation of the fastener 403 and the pinion 401 in a first rotation direction (e.g., clockwise or counterclockwise direction) causes the pinions 401, 411 to travel along the travel paths defined by the racks 402, 412 in a first travel direction. Conversely, rotation of the fastener 403 and the pinion 401 in a second rotation direction opposite the first rotation direction (e.g., counterclockwise or clockwise direction) causes the pinions 401, 411 to travel along the travel paths defined by the racks 402, 412 in a second travel direction opposite the first travel direction. In some embodiments, pinion 401 can be driven (e.g., by actuator 220, shown in FIG. 2 and FIG. 3) to rotate about rotation axis 604 to then drive the pinion 411 about rotation axis 444. Alternatively, pinion 411 can be driven (e.g., by actuator 220, shown in FIG. 2 and FIG. 3) to rotate about rotation axis 444 to then drive the pinion 401 about rotation axis 604.

With the frame 320 of the mechanism 225 anchored to the busway 105 (e.g., with bracket 330) and the pinions 401, 411 mechanically, rotatably linked with the bus plug 110, as the pinions 401, 411 rotate and travel along the travel paths of the racks 402, 412. Based on the travel of the pinions 401, 411, the first end 111 of the bus plug 110 raises or lowers relative to the busway 105. In an alternate embodiment (not shown), the racks 402, 412 can be mechanically fixed to the bus plug 110 with the pinions 401, 411 rotatably coupled to the frame 320. Thus, as the pinions 401, 411 rotate, rather than travelling along the travel paths of the racks 402, 412, the pinions 401, 411 can cause the racks 402, 412 to translate relative to the rotating pinions 401, 411. Based on the translation of the racks 402, 412 fixed to the bus plug 110, the first end 111 of the bus plug 110 raises or lowers relative to the busway 105 as the pinions 401, 411 rotate.

As schematically illustrated in FIG. 2 and FIG. 3, as the first end 111 of the bus plug 110 raises or lowers relative to the busway 105, the mechanism 225 causes the bus plug 110 to rotate relative to the second end 112 of the bus plug 110 about the rotation axis 213 defined by the hinge assembly 211 or as the protrusion 234 of the bracket assembly 231 slides along the arcuate recess 232 guiding the rotational movement of the bus plug 110. Accordingly, employing the actuator 220 and the controller 105, operation of the mechanism 225 including racks 402, 412 and pinions 401, 403 can be performed to remotely connect and disconnect the bus plug 110 relative to the busway 105.

Turning back to FIG. 7, as the pinions 401, 403 travel along the racks 402, 412, the fasteners 403, 413 correspondingly travel along the slots 312a, 312b defined in the frame 320. The slots 312a, 312b define a guide path along which the pinions 401, 403 travel and can facilitate predictable, repeatable alignment and travel of the pinions 401, 403 during successive racking operations. Similarly, as shown in FIG. 8, optional guide pins 313a, 313b extending from the bus plug 310 and mating with corresponding guide slots 314a, 314b defined in the frame 320 may be provided. As the pinions 401, 403 travel along the racks 402, 412, the guide pins 313a, 313b and corresponding guide slots 314a, 314b can further facilitate predictable, repeatable alignment and travel of the pinions 401, 403 during successive racking operations.

FIG. 10 is a perspective view of the power distribution system 100 and the remote racking device 200 showing the third embodiment of the mechanism 225 including a cam 505 and follower 510. The cam 310 is mechanically, rotatably linked to the bus plug 110 with fastener 503 (e.g., bolt, screw, rod, linkage) defining a camshaft 503 of the cam 505. The follower 510 includes a shaft 508 and a protrusion 509. The shaft 508 is coupled with bracket 330 that is mechanically linked to the busway 105. The protrusion 509 of the shaft 508 is oriented to engage a groove 507 of the cam 505. The groove 507 is defined as a non-linear path perpendicular to the rotation axis 606 of the cam 505 as defined by the camshaft 503. In some embodiments, the groove 507 can be formed as a recess or opening in a face of the cam 505. Additionally, the groove 507 can be defined as a curved path concentric to the rotation axis 606 having a radial dimension that gradually increases or decreases relative to the rotation axis 606 of the camshaft 503 with respect to an angle of rotation of the cam 505.

In some embodiments, the shaft 508 of the follower 510 extends through a recess 530 (e.g., aperture, notch) defined in the bracket 330. The bracket 330 is mechanically linked to the busway 105 and the recess 530 restricts movement of the follower 510 to a linear translation defined along a path perpendicular to the rotation axis 606. When operated, the rotation force 605 about rotation axis 606 causes the cam 505 and the groove 507 to rotate about the rotation axis 606. Based on the mating engagement between the groove 507 of the cam 505 and the protrusion 509 of the follower 510, the rotation of the cam 505 causes the follower 510 to move (e.g., translate in an unconstrained direction) while maintaining the protrusion 509 and the groove 507 in mating contact. Because the recess 530 and the bracket 330 restrict movement of the follower 510 to a linear translation defined along a path perpendicular to the rotation axis 606, as the cam 505 rotates, the follower 510 correspondingly translates along the path defined by the recess 530 of the bracket 330.

For example, in some embodiments, rotation of the cam 505 in a first rotation direction (e.g., clockwise or counterclockwise direction) causes the follower 510 to travel along a linear path defined by the recess 530 of the bracket 330 in a first direction. Conversely, rotation of the cam 505 in a second rotation direction opposite the first rotation direction (e.g., counterclockwise or clockwise direction) causes the follower 510 to travel along a linear path defined by the recess 530 of the bracket 330 in a second direction opposite the first direction. With the bracket 330 of the mechanism 225 anchored to the busway 105 and the cam 505 mechanically, rotatably linked with the bus plug 110, as the cam 505 rotates, the follower 510 travels to maintain the protrusion 509 of the follower 510 in mating contact with the groove 507. Based on the travel of the follower 510, the first end 111 of the bus plug 110 raises or lowers relative to the busway 105. As schematically illustrated in FIG. 2 and FIG. 3, as the first end 111 of the bus plug 110 raises or lowers relative to the busway 105, the mechanism 225 causes the bus plug 110 to rotate relative to the second end 112 of the bus plug 110 about the rotation axis 213 defined by the hinge assembly 211 or as the protrusion 234 of the bracket assembly 231 slides along the arcuate recess 232 guiding the rotational movement of the bus plug 110. Accordingly, employing the actuator 220 and the controller 105, operation of the mechanism 225 including the cam 505 and the follower 510 can be performed to remotely connect and disconnect the bus plug 110 relative to the busway 105.

The mechanism 225 can include a frame 550 mechanically fixed to the bus plug 110. As shown in FIG. 11, which is an alternate perspective view of the third embodiment of the mechanism 225 of FIG. 10 with some features including the bus plug 110 removed for clarity, the frame 550 include a guide slot 520 through which the shaft 508 of the follower 510 extends. Additionally, the mechanism 225 can include guide rods 511, 512 that extend through guide slots 521, 522 of the frame 550. Turning back to FIG. 10, the guide rods 511, 512 are fixed to the bracket 330 at respective joints 531, 532. As the follower 510 travels based on the rotating cam 505, the frame 550 and the bus plug 110 also travel in the direction of the follower 510. The slots 521, 522 of the frame 550 correspondingly slide along the guide rods 511, 512 fixed to the bracket 330. The guide rods 511, 512 define a guide path along which the follower 510 travels and can facilitate predictable, repeatable alignment and travel of the follower 510 and the cam 505 during successive racking operations. While two guide rods 511, 512 are shown, in further embodiments, a single guide rod or more than two guide rods can be provided.

FIG. 12 is an exploded perspective view of the third embodiment of the mechanism 225 of FIG. 10 and FIG. 11 with some features removed for clarity. In an alternate embodiment (not shown), the configuration of the cam 505 and follower 510 can be modified with the follower 510 fixed relative to the busway 105. For example, rather than a sliding engagement between the follower 510 and the bracket 330, as described above, the follower 510 can be fixed to the bracket 330 with the protrusion 509 provided at a stationary position relative to the bracket 330 and the busway 105. The cam 505 remains mechanically, rotatably mounted to the bus plug 110. Accordingly, as the cam 505 and the groove 507 rotate, the bus plug 110 raises and lowers relative to the fixed protrusion 509 of the follower 510 based on the curved path of the groove 507. Moreover, although not illustrated, it is to be understood that in further embodiments, the follower 510 can be fixed to the bus plug 100 and the cam 505 can be rotatably mounted relative to the busway 105. As the cam 505 rotates, the mating contact between the groove 507 and the protrusion 509 causes the follower 510 and the bus plug 110 to raise and lower relative to the cam 505 and the busway 105.

Features of the mechanism 225 can be provided either alone or in combination to obtain a remote racking device 200 configured to rack (e.g., connect and disconnect) the bus plug 110 with an active or energized busway 105, thereby reducing or preventing the risk of electrocution or electric shock of an operator or person in close proximity to the bus plug 110.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative system and method, and illustrative examples shown and described. Accordingly, departures may be made from such details without departing from the spirit or scope of the applicant's general inventive concept.

What is claimed is:

1. A method of racking a bus plug relative to a busway, comprising:
    imparting a force on a mechanism to operate a mechanical interaction of a first mechanical component coupled to the bus plug and a second mechanical component coupled to the busway,
        wherein imparting the force includes rotating a lead screw having a threaded shaft that threadingly engages a threaded aperture of a moving nut; and
    rotating the bus plug relative to the busway about a rotation axis defined by a mechanical assembly based on the mechanical interaction of the first mechanical component and the second mechanical component.

2. The method of claim 1, wherein the rotating the bus plug is performed while a bus bar of the busway has electrical current.

3. The method of claim 1, wherein the mechanical assembly is a hinge assembly.

4. The method of claim 1, wherein the mechanical assembly includes a bracket having an arcuate recess defining an arcuate path within which a protrusion of the bus plug is configured to slidingly engage.

5. The method of claim 1, wherein the force is imparted with an actuator.

6. The method of claim 1, wherein the first mechanical component further includes a pin extending from the moving nut and oriented to slide along a slot defined in a frame mechanically linked with the busway.

7. A method of racking a bus plug relative to a busway, comprising:
    imparting a force on a mechanism to operate a mechanical interaction of a first mechanical component coupled to the bus plug and a second mechanical component coupled to the busway,
        wherein imparting the force includes engaging a first set of teeth of a rack with a second set of teeth of a pinion; and
    rotating the bus plug relative to the busway about a rotation axis defined by a mechanical assembly based on the mechanical interaction of the first mechanical component and the second mechanical component.

8. The method of claim 7, wherein the rotating the bus plug is performed while a bus bar of the busway has electrical current.

9. The method of claim 7, wherein the mechanical assembly is a hinge assembly.

10. The method of claim 7, wherein the mechanical assembly includes a bracket having an arcuate recess defining an arcuate path within which a protrusion of the bus plug is configured to slidingly engage.

11. The method of claim 7, wherein the force is imparted with an actuator.

12. The method of claim 7, wherein the first mechanical component and the second mechanical component further define a second rack having a third set of teeth and a second pinion having a fourth set of teeth configured to engage the third set of teeth, and wherein the second set of teeth are configured to engage the fourth set of teeth.

* * * * *